United States Patent [19]

Emmons et al.

[11] Patent Number: 5,213,691
[45] Date of Patent: May 25, 1993

[54] PHOSPHONATE-CONTAINING POLYMERS FOR CONTROLLING SCALE IN UNDERGROUND PETROLEUM-CONTAINING FORMATIONS AND EQUIPMENT ASSOCIATED THEREWITH

[75] Inventors: Daniel H. Emmons, Rosenberg, Tex.; Dodd W. Fong, Naperville; Mary A. Kinsella, Manhattan, both of Ill.

[73] Assignee: Nalco Chemical Company, Naperville, Ill.

[21] Appl. No.: 772,173

[22] Filed: Oct. 7, 1991

[51] Int. Cl.$^5$ ................................................ C02F 5/14
[52] U.S. Cl. ..................................... 210/700; 166/310; 166/902; 210/701; 252/180
[58] Field of Search ........................ 166/310, 902; 210/698–701; 252/8.552, 180, 181, 82

[56] References Cited

U.S. PATENT DOCUMENTS

| | | | |
|---|---|---|---|
| 4,604,431 | 8/1986 | Fong et al. | 525/351 |
| 4,675,359 | 6/1987 | Kadono et al. | 524/832 |
| 4,678,840 | 7/1987 | Fong et al. | 525/340 |
| 4,710,303 | 12/1987 | Emmons | 210/698 |
| 4,801,388 | 1/1989 | Fong et al. | 210/701 |
| 4,937,002 | 6/1990 | Bainbridge et al. | 210/701 |
| 5,023,368 | 6/1991 | Leighton et al. | 210/700 |

*Primary Examiner*—Peter Hruskoci

[57] ABSTRACT

A method of removing from and preventing scale from depositing in underground petroleum containing formations and upon equipment used to inject high brine scale forming waters into such formations which comprises treating such waters with a scale inhibiting amount of an acrylic acid polymer which contains from 0-95 mole percent of acrylamide and from 1-30 mole percent of amido $C_1$-$C_6$ alkyl phosphonate groups from the group consisting of:

a) Amidomethyl phosphonate groups,
b) Alpha-hydroxy-beta-amidoethyl phosphonate groups,
c) Alpha-hydroxy-beta-amidoisopropyl phosphonate groups, and,
d) Amidopropyl phosphonate groups said polymer having a molecular weight range between 1,000–100,000.

3 Claims, No Drawings

PHOSPHONATE-CONTAINING POLYMERS FOR CONTROLLING SCALE IN UNDERGROUND PETROLEUM-CONTAINING FORMATIONS AND EQUIPMENT ASSOCIATED THEREWITH

BACKGROUND OF THE INVENTION

Inorganic scales that result from the deposition of solid salts from high brine supersaturated solutions injected into and/or removed from underground petroleum bearing formations frequently lead to lost production or well abandonment. Deposits can plug the formation near the wellbore, tubing string, downhole safety valves and other valves, and casing perforations. Subsurface pumps can stick and the operation of surface lines and equipment can be restricted.

Deposition can be initiated by a variety of factors including pressure, pH, temperature, turbulence, surface characteristics, or mixing of incompatible fluids. Incompatible fluids are frequently encountered during water flooding operations. A common factor that causes scale is pressure reduction encountered by fluids as they enter the wellbore during production. The partial pressure of $CO_2$ decreases which can lead to the precipitation of $CaCO_3$.

A variety of scales, both organic and inorganic, cause production problems. Common inorganic scales are calcium carbonate, calcium, barium, and strontium sulfate, and iron sulfides. The calcium salts are the most common.

Scales can either be removed or inhibited. Wells can also be re-perforated in order to circumvent the plugged area. Plugging is often seen at the perforation, where pressure changes are first seen. The well can also be fractured in order to bypass previously scaled areas. Both perforation and fracturing are expensive and only temporary remedies since scales will rapidly re-form.

The most efficient way of dealing with scale is to inhibit its formation. Chemicals can be sequestrants or work as a threshold inhibitor. Sequestrants form combination pairs with a species normally involved in precipitation, such as calcium ions. The interaction with the sequestrant is on a molar basis and therefore requires a large amount of chemical. While effective, this procedure could be cost limiting.

A much more effective chemical treatment is to use a threshold chemical, that is, one that inhibits at a concentration well below equimolar amounts. Threshold chemicals can be effective at concentrations as low as 1/1000th the concentration of the scaling mineral. Precipitation is a complicated process involving supersaturation, nucleation, and crystal growth. An inhibitor can function by one or more mechanisms. It can interfere with the nucleation process or rate. It can interfere with the growth process by blocking crystal growth sites. Crystal growth patterns can be altered. It can also prevent adhesion of crystals to one another or metal walls. In order to be effective, the scale inhibitor must be present during the nucleation stage of crystal growth.

The most common classes of inhibitor chemicals are inorganic phosphates, organophosphorus compounds and organic polymers. The common polyphosphates are sodium tripolyphosphate and hexametaphosphate. Organophosphorus compounds are phosphonic acid and phosphate ester salts. The organic polymers used are generally low molecular weight acrylic acid salts or modified polyacrylamides and copolymers thereof. Phosphonates and polymers are more thermally stable than polyphosphates or phosphate esters. Polyphosphates and phosphate esters hydrolyze at high temperatures forming orthophosphates, the metal salts of which may be more insoluble than the scales that they are intended to inhibit.

The polyphosphates have low brine solubilities and are therefore frequently injected as solids. They can be injected into the well bore by bypass feeders, baskets, filter packs, and bottomhole well packs. They can also be placed into the formation through fractures along with the fracturing fluids. The chemical then dissolves slowly, resulting in a steady, low concentration of inhibitor.

The phosphonates, phosphate esters and polymers are more water soluble and are therefore used as solutions. Either the wellbore or the formation can be treated. Both batch and continuous methods are used for treating the wellbore. They can also be added as a component of a fracturing fluid. These treatments are not optimum, since chemical does not contact the point of initial scale formation—the formation face or casing perforations. However, the tubing string and surface equipment will be treated.

A more efficient and less costly procedure is a "squeeze" treatment, in which the chemical is injected into formation. Production is halted while chemical is injected at a pressure below frac pressure. The chemical optimally penetrates the formation to a distance 1–6 feet radially from the wellbore. Inhibitor will then be released into the wellbore as production is resumed. Ideally, the concentration of inhibitor is constant and low (at a concentration slightly above that required for total inhibition—generally 2–4 ppm). The lifetime of a squeeze depends on the flow rate, oil/water ratio and many other factors but can last for 6 months and even up to 2 years.

The residual concentrations of phosphonates and phosphate esters can be easily and accurately determined in oil field brines by a titration method. However, no accurate method exists for field testing of polymer residuals. Many users are interested in a polymer squeeze but are reluctant to perform one due to the problem of residual determination.

Since precipitation squeezes are believed to be superior to adsorption squeezes, a superior squeeze chemical should be one whose calcium salt has a very low solubility. However, the solubility should not be so low that the concentration of produced inhibitor is below that required for effective scale inhibition.

Also, an inhibitor is needed that will inhibit barium sulfate scale as well as the more common scales. Barium sulfate scale is almost impossible to remove once formed and is becoming a more frequent problem, especially in Alaska and many foreign locations. In locations such as the North Sea, barium and strontium sulfate inhibition is becoming a major problem as waterflooding operations involving sea water increase.

THE INVENTION

The invention comprises a method of removing from and preventing scale from depositing in underground petroleum containing formations and upon equipment used to inject high brine scale forming waters into these formations. It comprises treating such waters with a scale inhibiting amount of an acrylic acid polymer which contains from 0–95 mole percent of acrylamide and from 1–30 mole percent of amido $C_1$–$C_6$ alkyl phosphonate groups from the group consisting of:
a) Amidomethyl phosphonate groups,
b) Alpha-hydroxy-beta-amidoethyl phosphonate groups,
c) Alpha-hydroxy-beta-amidoisopropyl phosphonate groups, and,
d) Amidopropyl phosphonate groups said polymer having a molecular weight range between 1,000–100,000.

In a preferred embodiment of the invention the polymer contains from 5–50 mole percent of acrylamide groups. The preferred phosphonate substituent are amidomethyl phosphonate groups.

The molecular weight of the polymers may be between 1,000–100,000. Preferably it is within range of 1,000–20,000 and most preferably within the range of 1,000–10,000.

The amount of polymers required to reduce scale and corrosion will vary depending upon the particular brine being treated and the conditions under which it is used. Dosages range from between as little as 0.05–1 part per million up to as much as 150 ppm. Typical dosages, however, are within the range of 0.1–10 ppm. They may be as high as 50 ppm. Routine experimentation can determine the exact amount of polymer that is necessary to achieve optimum results. These dosages relate to the dosages of the active polymer which are oftentimes supplied commercially in the form of aqueous solutions or as water-in-oil emulsion. The high brine scale forming waters treated by the invention contain at least 1,000 ppm total hardness. They often contain about 3,000 ppm or more of total hardness. The brines while usually containing calcium hardness contain a mixture of salts such as calcium carbonate, calcium sulfate, calcium phosphate and other scale producing salts. The inhibitors of the invention are particularly useful in treating barium and strontium scales, which as previously indicated are difficult to treat.

PREPARATION OF THE POLYMERS

The polymers used in the practice of the invention, are described in prior publications. Their method of preparation is described in U.S. Pat. Nos. 4,678,840 and 4,675,359. The disclosures of these patents are incorporated herein by reference.

In U.S. Pat. No. 4,678,840 there is shown a transamidation reaction whereby the amide groups of an acrylamide polymer are substituted by reacting them with an amino alkyl phosphonate.

Another method of producing the polymers resides in the reaction of an amino $C_1$–$C_6$ alkyl phosphonate directly with an acrylic acid polymer under conditions whereby the amino radical is amidated with the carboxylic acid groups of the acrylic acid polymer. This technique which has been used to amidate amino alkyl sulfonic acids is the subject of U.S. Pat. No. 4,604,431, the disclosure of which is incorporated herein by reference.

Yet another method of producing the polymers of the invention is to oxidize the corresponding phosphinate polymers, e.g. polymers corresponding exactly to those used in the invention which contain phosphinate groups. These polymers are readily oxidized using peroxides, sulfites, formaldehydesulfoxylate and other well known oxidizing agents to oxidize the phosphinate groups to the phosphonate groups.

It is to be understood that in the practice of the invention the term "phosphonate groups" or the term "phosphonate" is intended to include, both in the specification and in the claims, not only the water soluble salts of the phosphonic acid groups, e.g. the alkali metal such as sodium or potassium, but also the ammonium or amine salts. Also included is the free acid form of the phosphonic acid.

The polymers may contain minor amounts of diluent monomers such as acrylonitrile (AN) and vinyl acetate (VAc), when used such diluent monomers may be present in amounts ranging between 1–15 mole percent. The amount used should not be such so as to diminish water solubility of the polymer.

EVALUATION OF PHOSPHONIC ACID POLYMERS AS SCALE INHIBITORS

Test Methods

Static inhibition tests were used for evaluation. These included lab tests for calcium carbonate, calcium sulfate and barium sulfate and are described here.

$CaCO_3$ SCALE DEPOSITION TEST PROCEDURE APPARATUS:

1. Constant temperature bath (100° to 200° F.).
2. Glass test cells (4-oz. bottles with screw lid).
3. Synthetic brines

| A. | 12.16 gms/L | $CaCl_2$—$2H_2O$ |
|---|---|---|
|    | 3.68 gms/L  | $MgCl_2$—$6H_2O$ |
|    | 33.00 gms/L | NaCl |
| B. | 7.36 gms/L  | $NaHCO_3$ |
|    | 29.40 mg/L  | $Na_2SO_4$ |
|    | 33.00 gm/L  | NaCl |

4. Graduated cylinders 2–50 mL.
5. Appropriate solutions of inhibitors to be tested.
6. Pipettes: 1–0.1 mL, 1–1.0 mL and 1–10 mL.
7. 125 mL Erlenmeyer flasks for each inhibitor to be tested.
8. Standard EDTA solution.
9. 6 normal sodium hydroxide
10. Ammonium purpurate indicator.
11. 10 mL micro buret.

PROCEDURE

1. Using the appropriate solutions of inhibitors, pipette the desired amount of inhibitor into each cell.
2. Two controls (blanks) are set up with each test. Controls contain no inhibitor.
3. Brines A and B should be saturated with $CO_2$ for thirty minutes before using.
4. Add 50 mL of Brine A and B to each test cell.
5. Cap test cells and agitate to thoroughly mix brines and chemicals.
6. Put test cell in water bath at 160° F. for 24 hours.
7. After exposure at the 160° temperature for 24 hours, the test cells are removed and allowed to cool to room temperature.
8. Pipette 1 mL of the brine from each test cell and transfer to the Erlenmeyer flask.
9. Add 50 mL of distilled water to the Erlenmeyer.
10. Add 1 mL of 6N sodium hydroxide.
11. Add a small amount of ammonium purpurate indicator and titrate with the EDTA solution. The color changes from pink to violet.
12. The amount of $CaCO_3$ retained in solution is computed by multiplying the mL of standard EDTA solution used by 1000. The results are expressed as calcium carbonate.

13. A typical scale evaluation is found below:

| CALCIUM CARBONATE RETAINED IN SOLUTION (Mg/L) | | | | | |
|---|---|---|---|---|---|
| CHEMICAL | 1 PPM | 3 PPM | 5 PPM | 10 PPM | 20 PPM |
| A | 3,000 | 3,400 | 3,800 | 4,000 | 4,300 |
| B | 3,500 | 4,000 | 4,100 | 4,100 | 4,100 |
| C | 3,600 | 4,300 | 4,300 | 4,300 | 4,300 |

Blank (after precipitation) 2,600 mg/L as $CaCO_3$
Blank (before precipitation) 4,300 mg/L as $CaCO_3$ 14. Test results may also be recorded in percent inhibitor as illustrated below:

| TEST RESULTS IN PERCENT INHIBITION | | | | | |
|---|---|---|---|---|---|
| CHEMICAL | 1 PPM | 3 PPM | 5 PPM | 10 PPM | 20 PPM |
| A | 24 | 46 | 71 | 82 | 100 |
| B | 53 | 82 | 88 | 88 | 88 |
| C | 69 | 100 | 100 | 100 | 100 |

Blank (after precipitation) 2,600 mg/L as $CaCO_3$
Blank (before precipitation) 4,300 mg/L as $CaCO_3$

$CaSO_4$ DEPOSITION TEST PROCEDURE

This test is very similar to the calcium carbonate test previously described. The basic differences are the brine composition and elimination of the carbon dioxide saturation step. These synthetic brine compositions follow:

| Synthetic brines | | |
|---|---|---|
| A. | 7.50 gms/L | NaCl |
|  | 11.10 gms/L | $CaCl_2$—$2H_2O$ |
| B. | 7.50 gms/L | NaCl |
|  | 10.66 gms/L | $Na_2SO_4$ |

STANDARD $BaSO_4$ SCALE DEPOSITION TEST PROCEDURE

SOLUTIONS 1. 1% or 0.1% distilled water solutions of the chemicals being tested.
2. Brine X 42 grams of sea salt dissolved in distilled water to make one liter of Brine X Sea-Salt (ASTM D-1141-52)

3. Brine Y 25 grams of analytical grade sodium chloride and 0.0456 grams of analytical grade $BaCl_2$—$2H_2O$ dissolved in distilled water to make one liter of Brine Y.
4. Brine Z 50 grams of analytical grade $NaHCO_3$ dissolved in distilled water to make one liter of Brine Z.

PROCEDURE

1. Saturate Brine Z for 15 minutes with $CO_2$.
2. Add chemical to be tested into a 4-ounce sample bottle.
3. Add 78 mL brine Y into 4-ounce bottle.
4. Add 20 mL brine X into the 4-ounce bottle.
5. Add 2 mL brine Z into the 4-ounce bottle.
6. Cap and shake bottle and then allow to stand 24 hours at room temperature.
7. Filter the sample through a 0.45 millipore filter and determine soluble barium.

8. The results are reported as percent inhibition using the following formula.

$$\text{Percent Inhibition} = \frac{(S - BAP)}{(BBP - BAP)} \times 100$$

where:

$BBP$ = Barium in sample before precipitation
$BAP$ = Barium in untreated sample after precipitation
$S$ = Barium in treated sample after precipitation The barium concentration may be determined by any suitable method.

RESULTS

TABLE 1

| COMPOSITION OF BACKBONE POLYMERS REACTED WITH AMINOMETHANE PHOSPHONIC ACID | | | |
|---|---|---|---|
| SAMPLE NUMBER | POLYMER COMP. | Mw | % POLYMER |
| -014 | 100% AA (acrylic acid) | 7100 | 35 |
| -015 | 50/50 AA/AAm (acrylamide) | 6450 | 35 |
| -018 | 50/30/20 AA/AAm/MAA (methacrylic acid) | 11200 | 35 |
| -021 | 45/50/5 AA/AAm/ACN (acrylonitrile) | 6500 | 35 |
| -022 | 45/50/5 AA/AAm/VAc (vinyl acetate) | 7050 | 35 |

| PHOSPHONIC ACID FUNCTIONALIZED POLYMERS | | | |
|---|---|---|---|
| INHIBITOR | BACKBONE POLYMER | CCMPOSITION $PC_3/CO_2H$ | % POLYMER |
| -023 | 3053-014 | 2.9/97.8 | 34.2 |
| -034 | 3053-014 | 2.1/97.9 | 32.4 |
| -024 | 3053-015 | 3.1/61 | 34.6 |
| -035 | 3053-015 | 5.3/47 | 33.8 |
| -025 | 3053-018 | 4.3/53 | 34.3 |
| -037 | 3053-018 | 5.5/53 | 33.2 |
| -027 | 3053-021 | 3.7/58 | 34.8 |
| -042 | 3053-021 | 4.9/56 | 33.6 |
| -026 | 3053-022 | 3.8/63 | 34.9 |
| -043 | 3053-022 | 4.7/60 | 33.6 |

Subsequent information indicates that the degree of phosphonic acid substitution onto the polymer backbone is higher than reported in the table.

CALCIUM CARBONATE RESULTS

All the PAPS and a commercial inhibitor* were evaluated on the described calcium carbonate deposition test. Results appear in Table II.

* Visco 953

TABLE II

| RESULTS PAPS EVALUATION - $CaCO_3$ (RESULTS IN PERCENT INHIBITION) INHIBITOR CONCENTRATION (ppm) | | | | | |
|---|---|---|---|---|---|
| INHIBITOR | 1 | 2 | 3 | 5 | 10 |
| -014 | 36 | — | 100 | — | — |
| -023 | 29 | — | 100 | — | — |
| -034 | 29 | — | 100 | — | — |
| -015 | — | — | — | — | 57 |
| -024 | 14 | — | 93 | 100 | — |
| -035 | 14 | — | 79 | 100 | — |
| -018 | 14 | — | 64 | 100 | — |
| -025 | 14 | — | 79 | 100 | — |
| -037 | 7 | — | 57 | 93 | 100 |
| -021 | — | — | — | — | 57 |
| -027 | 21 | — | 79 | 100 | — |
| -042 | 21 | — | 86 | 100 | — |
| -022 | — | — | — | 50 | 64 |
| -026 | 21 | — | 86 | 100 | — |

TABLE II-continued

RESULTS PAPS EVALUATION - CaCO3
(RESULTS IN PERCENT INHIBITION)
INHIBITOR CONCENTRATION (ppm)

| INHIBITOR | 1 | 2 | 3 | 5 | 10 |
|---|---|---|---|---|---|
| -043 | 21 | — | 86 | 100 | — |

Blank before precipitation = 4,200 mg/L $Ca^{2+}$ as $CaCO_3$
Blank after precipitation = 2,800 mg/L $Ca^{2+}$ as $CaCO_3$ Based on results, it is quite clear that the performance of 015, 021 and 022 are dramatically improved after reaction with aminomethane phosphonic acid. This is not unreasonable and suggests that the aminomethanephosphonic acid is replacing at least part of the acrylamide, acrylonitrile and/or vinyl acetate as a pendant group. Phosphonic acid functionally is known to be an effective antiscalant while acrylamide, acrylonitrile and vinyl acetate show little or no functionality.

No improvement in performance of the polymers derived from acrylic acid homopolymer or acrylic acid, acrylamide, methacrylic acid terpolymer was seen. This suggests that the phosphonic acid and carboxyl pendant groups act very similar when considering calcium carbonate deposition prevention. It should be remembered, however, the polymers of this invention can be readily detected in small quantities.

CALCIUM SULFATE RESULTS

The results of calcium sulfate testing follow on Table III.

TABLE III

RESULTS OF POLYMER EVALUATION - CaSO4
(RESULTS IN PERCENT INHIBITION)
INHIBITOR CONCENTRATION (ppm)

| INHIBITOR | 0.1 | 0.2 | 0.3 | 0.5 | 1.0 |
|---|---|---|---|---|---|
| -014 | 08 | — | 50 | 100 | — |
| -023 | 13 | — | 58 | 100 | — |
| -034 | 08 | — | 100 | — | — |
| -015 | 17 | — | 29 | 92 | 100 |
| -024 | 13 | — | 42 | 92 | 100 |
| -035 | 21 | — | 38 | 79 | 100 |
| -018 | 13 | — | 25 | 38 | 100 |
| -025 | 21 | — | 29 | 63 | 100 |
| -037 | 17 | — | 29 | 38 | 92 |
| -021 | 17 | — | 38 | 54 | 96 |
| -027 | 13 | — | 29 | 75 | 100 |
| -042 | 21 | — | 33 | 75 | 100 |
| -022 | 08 | — | 33 | 50 | 100 |
| -026 | 13 | — | 38 | 88 | 100 |
| -043 | 17 | — | 46 | 88 | 100 |

Blank before precipitation = 3,750 mg/L $Ca^{2+}$ as $CaCO_3$
Blank after precipitation = 2,550 mg/L $Ca^{2+}$ as $CaCO_3$

BARIUM SULFATE RESULTS

Included as Table IV are the results of barium sulfate scale testing.

TABLE IV

RESULTS OF POLYMER EVALUATION - BaSO4
(RESULTS IN PERCENT INHIBITION)
INHIBITOR CONCENTRATION (ppm)

| INHIBITOR | 1 | 2 | 3 | 5 | 10 | 20 | 50 |
|---|---|---|---|---|---|---|---|
| Commercial Inhibitor | 61 | 99 | 100 | 100 | — | — | — |
| -014 | — | — | — | 78 | 94 | 96 | 97 |
| -023 | 91 | 99 | 100 | 99 | 99 | 97 | 99 |
| -034 | 84 | 99 | 100 | 94 | 95 | 99 | 100 |
| -015 | — | — | — | 02 | 06 | 08 | 50 |
| -024 | 78 | 99 | 99 | 97 | 98 | 98 | 99 |
| -035 | 89 | 100 | 99 | 99 | 100 | 100 | 100 |
| -018 | — | — | — | 22 | 44 | 57 | 76 |
| -025 | 89 | 99 | 99 | 100 | 100 | 100 | 100 |
| -037 | 84 | 99 | 99 | 100 | 100 | 100 | 100 |
| -021 | 03 | 04 | 06 | 06 | — | — | — |
| -027 | 64 | 99 | 100 | 99 | — | — | — |
| -042 | 92 | 99 | 100 | 99 | — | — | — |
| -022 | 03 | 05 | 07 | 09 | — | — | — |
| -026 | 67 | 98 | 98 | 99 | — | — | — |
| -043 | 75 | 99 | 99 | 99 | — | — | — |

Blank before precipitation = 17.8 mg/L $Ba^{2+}$
Blank after precipitation = 2.4 mg/L $Ba^{2+}$ All samples of the phosphonate containing polymers showed increases in performance over their parent compounds. It is difficult to conclude which polymer was the best performer, all the derivatives were extremely effective.

Any of the polymers tested could be used effectively as a traceable squeeze treatment inhibitor for barium sulfate. Based on calcium carbonate and sulfate results, a similar product would be recommended.

We claim:

1. A method of preventing barium sulfate scale from depositing in underground petroleum containing formations and upon equipment used to inject barium sulfate scale forming waters which contains at least 1,000 ppm hardness into such formations which comprises treating such waters with a barium sulfate scale inhibiting amount of an acrylic acid polymer which contains from 0-95 mole percent of acrylamide and from 1-30 mole percent of amido $C_1$-$C_6$ alkyl phosphonate groups from the group consisting of:

a) Amidomethyl phosphonate groups,
   b) Alpha-hydroxy-beta-amidoethyl phosphonate groups,
   c) Alpha-hydroxy-beta-amidoisopropyl phosphonate groups, and,
   d) Amidopropyl phosphonate groups said polymer having a molecular weight range between 1,000-100,000.

2. The method of claim 1 where the acrylamide polymer contains from 5-50 mole percent of acrylamide groups, and the molecular weight of the polymer is within the range of 1,000-20,000.

3. The method of claim 1 where the amido $C_1$-$C_6$ alkyl phosphonate group is amidomethyl phosphonate.

* * * * *